United States Patent
Pison et al.

(10) Patent No.: US 8,923,860 B2
(45) Date of Patent: Dec. 30, 2014

(54) METHOD OF CONFIGURING MODULES FOR IDENTIFYING USERS OF A TELECOMMUNICATION NETWORK

(75) Inventors: Laurent Pison, Jouars-Ponchartrain (FR); Olivier Paterour, Guyancourt (FR); Gérard Marque-Pucheu, Verneuil (FR)

(73) Assignee: Cassidian SAS, Elancourt (FR)

( * ) Notice: Subject to any disclaimer, the term of this patent is extended or adjusted under 35 U.S.C. 154(b) by 149 days.

(21) Appl. No.: 13/642,109

(22) PCT Filed: Feb. 25, 2011

(86) PCT No.: PCT/EP2011/052861
§ 371 (c)(1),
(2), (4) Date: Oct. 18, 2012

(87) PCT Pub. No.: WO2011/131398
PCT Pub. Date: Oct. 27, 2011

(65) Prior Publication Data
US 2013/0029665 A1    Jan. 31, 2013

(30) Foreign Application Priority Data
Apr. 20, 2010 (FR) .................................. 10 53015

(51) Int. Cl.
*H04W 60/00* (2009.01)
*H04W 8/26* (2009.01)

(52) U.S. Cl.
CPC ...................................... *H04W 8/26* (2013.01)
USPC ......................... 455/435.1; 455/411; 455/403

(58) Field of Classification Search
USPC ................. 455/403, 411, 414.1, 435.1–435.3
See application file for complete search history.

(56) References Cited

U.S. PATENT DOCUMENTS

2003/0208628 A1* 11/2003 Karjanlahti ................... 709/249
2005/0009504 A1   1/2005 Kyung et al.

FOREIGN PATENT DOCUMENTS

WO    WO 2009/000968 A2    12/2008

OTHER PUBLICATIONS

International Search Report as issued for PCT/EP2011/052861.
"ITU-T E.212: International Operation Maritime Mobile Service and Public Land Mobile Service: The International Identification Plan for Public Networks and Subscriptions"; ITU-T Series E: Overall network operation, telephone services, service operation and human factors, ITU-T Recommendation E.212, May 2008; XP002611801, Switzerland, Geneva 2005.
"Terrestrial Trunked Radio (TETRA)' Voice plus Data (V+D); Designers guide; Part 5: Guidance on numbering and addressing", Technical Report, European Telecommunications Standards Institute (ETSI), 650, Route Des Lucioles, F-06921 Sophia-Antipolis, France, vol. TETRA 3; No. V1.3.1; Mar. 1, 2010; XP014046262.

* cited by examiner

*Primary Examiner* — Kashif Siddiqui
(74) *Attorney, Agent, or Firm* — Pillsbury Winthrop Shaw Pittman LLP

(57) ABSTRACT

A method of configuring modules for identifying users of a telecommunication network able to cover a service area cut into a plurality of geographical sub areas, each identification module including an identification code stored in the module, the identification code including:—an operator identifier;—a user identification number; the method including assigning a part of the user identification number to the operator, the part being used for purposes other than identification of the user.

8 Claims, 1 Drawing Sheet

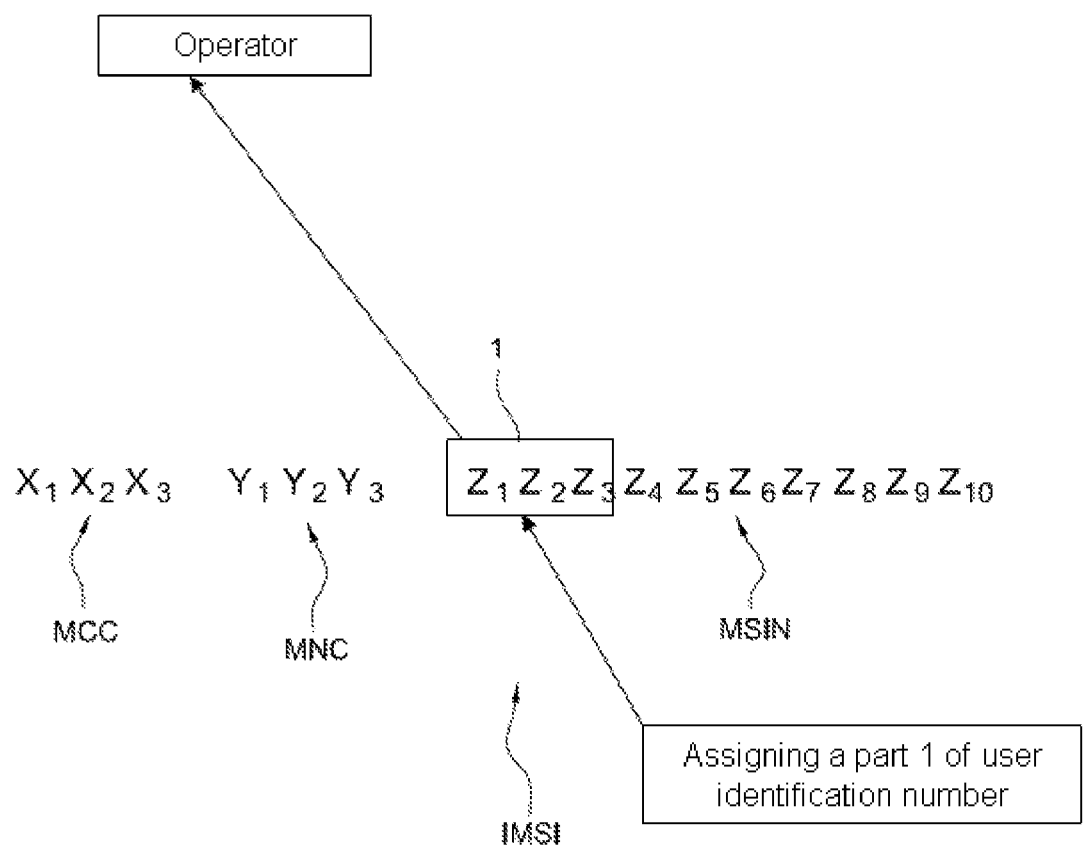

METHOD OF CONFIGURING MODULES FOR IDENTIFYING USERS OF A TELECOMMUNICATION NETWORK

CROSS REFERENCE TO RELATED APPLICATIONS

This application is the U.S. National Stage of PCT/EP2011/052861, filed Feb. 25, 2011, which in turn claims priority to French Patent Application No. 1053015, filed Apr. 20, 2010, the contents of all applications are incorporated herein by reference in their entireties.

The present invention is situated in the telecommunications field and more specifically relates to a method of configuring modules for identifying users of a telecommunication network whose national operator identification is recognized at the worldwide level through a standard for the purposes of mobility. More particularly, it is registered in 3GPP (GSM, UMTS, LTE, and future technologies), IEEE such as, for example, WiMAX (802.16) or WIFI (802.11) technologies, 3GPP2 (CDMA) or else TETRA, P25, etc., type standards.

The invention finds a particularly interesting application in the case of PMR (Professional Mobile Radiocommunications) professional radiocommunication networks, and more particularly concerning the use of broadband telecommunication technologies.

In a known manner, each user of a PLMN (Public Land Mobile Network) public mobile telecommunication network currently has an identification module of the SIM (Subscriber Identity Module) card type in which an identifier such as an IMSI (International Mobile Subscriber Identity) identifier is stored. The syntax of the IMSI identifier is described in the ITU-T E.212 standard issued by the ITU (International Telecommunication Union). This public network may be a second generation cellular network of the GSM (Global System for Mobile communications) or GPRS (Global Packet Radio Service) type, a third generation network such as UMTS (Universal Mobile Telecommunications System) networks, or a fourth generation network of the LTE (Long Term Evolution) type defined by the 3GPP (for 3rd Generation Partnership Project) standard.

The IMSI identifier is composed in the following manner:
- a 3-digit MCC (Mobile Country Code) code corresponding to the code of the country;
- a 2- or 3-digit MNC (Mobile Network Code) code corresponding to the code of the operator;
- a 10 or fewer digit MSIN (Mobile Subscriber Identification Number) code corresponding to the number of the subscriber inside the network.

The MCC and MNC codes are allocated statically (cf. ITU-T E 212 for networks of the 3GPP type, ITU-T 218 for networks of the trunk (i.e., TETRA for Trans European Trunked Radio) type or else IEEE for networks of the WiMAX type.

In addition, a user is associated with an operator and has a unique location register better known by the term "HOME." The user may also have several rights of access as a visitor; access as a visitor depends on roaming agreements or on the subscription chosen.

A user identifier (of the IMSI type) may not be common to two countries, since the user identifier contains the MCC/MNC or Operator Id code that is unique at the international level. Therefore, an IMSI code is unique at the international level.

In addition, professional radiocommunication systems called PMR (for "Professional Mobile Radiocommunications") systems of the TETRA (Trans European Trunked Radio) or TETRAPOL type, defined by the industrial. forum TETRAPOL (http://www.tetrapol.com) or else of the P25 type defined by the "Telecommunications Industry Association (TIA)" for the "Association of Public-Safety Communications Officers (APCO)" are known. PMR networks are independent mobile communication networks dedicated for the use of companies or administrations, particularly to ensure public safety or industrial safety or to intervene in transport activities. PMR networks are largely utilized by public safety services (police forces and national police, for example) and emergency services, and also by many other user categories (public transport, airports, etc.). These are private networks that present a high level of security. Current PMR networks, based on the technologies cited above, are known as narrowband networks, characterized by a channel width on the order of about ten kilohertz (kHz).

The evolution of telecommunications networks and the rise of high bandwidth encourage PMR systems users to demand applications that are still more advanced, necessitating a higher bandwidth. Consequently, it is important to be able to make PMR systems evolve to the highest broadband widths, for example by implementing a broadband technology (for example of the LTE (Long Term Evolution) or WiMAX (Worldwide Interoperability for Microwave Access) type). Such systems will consequently respond to an identification system defined according to the ITU-T E.212 standard. It follows that an IMSI identifier must be assigned to each user of a PMR network.

More particularly, to be identifiable, a PMR network user must usually have an identifier allowing him to be assigned, on the one hand, a geographical area, such as for example a department for France or a county for the United States, and on the other hand, a user (or national organization) category, such as for example the police, firefighters or ambulances.

For example, in the case of the United States, a PMR network must be divided into a plurality of geographical areas, each geographical area designating a county from among more than 3000 counties forming the American territory. In addition, within each geographical area (constituted by a county for the United States) three categories of users are considered, for example: The police, the army and the firefighters. Thus, in such an implementation, a minimum of 9000 identifier categories is needed, only enabling sorting per county and per user category. Considering the high number of PMR systems, such a solution for configuring identification would thus seems difficult to consider.

Even though the number of MNC identifiers (for a country defined by an MCC code) would be sufficient, the national administrator probably would not be able to handle the management of such a number of MNC identifiers.

In this context, the invention aims to propose a method of assigning operator identifiers (for example of the MCC/MNC type according to the ITU-T E.212 standard or of the Operator ID type in WiMax technology) in a PMR type network by taking the specificities of a PMR type network into account, that are on the one hand, the segmentation of the same service area into geographical sub areas and on the other hand, the multiplicity of user categories.

For this purpose, the invention applies to a method of configuring modules for identifying users of a telecommunication network able to cover a service area cut into a plurality of geographical sub areas, each identification module comprising an identification code stored in said module, said identification code comprising:

an operator identifier;

a user identification number;

Said method being characterized in that the method comprises a step of assigning a part of said user identification number to said operator, said part being utilized for purposes other than user identification.

Thanks to the invention, it is possible to use PMR networks with a broadband type technology while responding to the constraints of the ITU-T E212 standard. In fact, according to the method of the invention, a part of the user identification number is used by the operator as he chooses concerning engineering. For example, the operator may cut a service area such as, for example, a country into a plurality of sub geographical areas without requiring a number of operator identifiers equal to the number of geographical sub areas. In fact, thanks to the invention, a same operator identifier is used for a national operator such as, for example, the police. This national operator will then assign a part of the user identification number to cut the French territory into geographical sub areas.

To do this, preferentially, the method according to the invention comprises a step of selecting by said operator a specific identification sub number corresponding to said part of said user identification number, said selected specific identification sub number being assigned to a geographical sub area.

According to this last embodiment, the fact that the sub numbers of two contiguous geographical sub areas are different and at least two non-contiguous geographical sub areas have an identical sub number may be utilized. In other words, according to the method of the invention, the sub number is used to cut a service area such as, for example, a country into a plurality of geographical sub areas without requiring a number of sub numbers equal to the number of geographical sub areas. In fact, thanks to this embodiment, a same sub number is used to designate at least two non-contiguous geographical sub areas. Of course, the reuse rate of a same sub number in a same service area depends on both the area of the service area and the engineering of the operator.

In addition, according to another particularly advantageous implementation of the method of the invention, the latter comprises a step of selecting by said operator a specific identification sub number corresponding to said part of said user identification number, said selected specific identification sub number being assigned to a temporary mission.

This particularity enables a user, belonging to a specific geographical sub area A, to intervene in a mission situated in one specific geographical sub area B. The user will then be recognized by the telecommunication network of the specific geographical sub area B as a user belonging to the mission by means of his specific identification sub number. In this case, the user will be recognized by the network as a "HOME" type user. It will be noted that missions are most often temporary; once the mission is accomplished, the operator may assign the specific identification sub number to another mission.

According to a particularly interesting embodiment of the method of the invention, said operator identifier comprises:

an MCC identification code of said service area;

an MNC code, said MNC code being assigned, to an operator.

In general, a user has an internationally recognized operator identifier. This operator identifier comprises a PLMN id or operator id uniquely defining its "HOME" network. Outside of this "HOME" type PLMN id, the user is always considered to be a "VISITOR." When the user is considered to be a "Visitor," he will either be refused or accepted by a network. He is accepted if a roaming type agreement exists between the "VISIT" network operator and the operator of his "HOME" network.

In addition to the main characteristics that have just been mentioned, the method of configuring modules for identifying users of a telecommunication network according to the invention may present one or more of the additional characteristics below, considered individually or according to all technically feasible combinations:

said part of said user identification number assigned to said operator comprises at least three digits; it will be noted that fewer than three digits may be used for a small country having a small number of organizations; for countries with more organizations, at least 3 digits seems to be reasonable (for example three digits for France and a number equal to or greater than three digits for the USA);

said telecommunication network is a PMR network;

said identification code stored in said identification module responds to a syntax such as defined in one of the following standards

ITU-T E212;

ITU-T E218; or

IEEE.

The object of the invention also relates to a user terminal comprising an identification code configured by a method in conformance with the invention.

Other characteristics and advantages of the invention will clearly emerge from the description that is given below, for indicative and in no way limiting purposes, with reference to FIG. 1 that represents an identification code configured by a method in conformance with the invention.

The invention relates to a method of configuring modules for identifying users of a telecommunication network able to cover a service area. In the example from the description, this service area is formed by the French territory. The French territory is cut into a plurality of geographical sub areas. In the example, each geographical sub area is formed by a department.

Each telecommunication network user comprises. an identification module comprising a particular identification code. This identification code is stored in the identification module. By way of a non-limiting example, for the rest of the description, the identification code is formed by an IMSI identification code whose syntax responds to the ITU-T E.212 standard issued by the ITU (International Telecommunication Union).

The structure of the IMSI identification code is represented in FIG. 1. The IMSI identification code comprises:

a three-digit MCC identification code corresponding to the service area that in the example designates a country, the MCC code may be formed of three digits;

a two or three digit (preferentially three in the case of the method according to the invention) MNC code. This MNC code is assigned to a PMR type operator;

a 10 or fewer digit identification number (or code) of the MSIN user. More particularly, a part 1 of the identification number of the MSIN user is assigned, to said operator. This part of the number may be constituted of three digits forming a range of values. This range is managed by the PMR type operator.

The national operator, formed in our example by the police, has a unique MNC code assigned by the ITU (International Telecommunication Union). This MNC code may, in a non-limiting manner, be formed by syntax of the 001 type.

In addition, the operator will then manage a part 1 of the identification number of the MSIN user. This part 1 belongs to a range of values dedicated to the operator (the police in our example). This part 1 may comprise three digits, for example.

The operator may then assign a specific identification sub number corresponding to said part 1 of the user identification number to a geographical sub area.

By way of illustration, the operator may assign a specific identification sub number 001 to a geographical sub area delimited by the department of Aveyron and a specific identification sub number 002 to a geographical sub area delimited by the department of Yvelines.

Thus, a user from the Yvelines department network having an IMSI code including a specific identification sub number 002 may access the PMR network of Yvelines as a "HOME" user. Then, when the user moves in the Aveyron department, he will not be recognized as a "HOME" user by the PMR network of Aveyron and thus will be considered to be a visitor.

The Yvelines user may access the PMR network situated in Aveyron if he has a prior "roaming" type interoperator mobility agreement with the PMR operator of Aveyron.

Similarly, to be accepted by the public PLMN telecommunication mobile network, the Yvelines user considered to be a visitor by this same public PLMN telecommunication mobile network must have access rights (the type of access rights depends on the existence of roaming agreements within the public PLMN telecommunication mobile network).

In addition, the operator may utilize a specific identification sub number corresponding to part 1 of the user identification number to assign it to a temporary mission. In fact, certain organizations (such as, for example, GIGN (National Gendarmerie Intervention Group)) with inherent mobile and temporary missions not associated with a given geographical sub area will always have their users associated as "HOME" users with this specific identification number known as a "floating" code for each mission. In this case, their specific identification sub number known as a floating code may be reused later for another mission situated in a different geographical sub area.

The invention. is described above by way of example; it is understood that the person skilled in the art is able to carry out different variations of the method of configuring modules for identifying users of a telecommunication network, in particular concerning the type of identification code.

The invention claimed is:

1. A method of configuring identification modules for identifying users of a telecommunication network able to cover a service area cut into a plurality of geographical sub areas, each identification module comprising an identification code stored in said module, said identification code comprising:
   an operator identifier;
   a user identification number;
   the method comprising assigning a part of said user identification number to said operator, said part being utilized for purposes other than user identification, and
   selecting by said operator of at least a specific identification sub number corresponding to said part of said user identification number, said selected specific identification sub number being assigned to a geographical sub area or to a temporary mission, the sub numbers of two contiguous geographical sub areas being different and at least two non-contiguous geographical sub areas having an identical sub number.

2. The method according to claim 1, wherein said operator identifier comprises:
   an MCC identification code of said service area;
   an MNC code, said MNC code being assigned to an operator.

3. The method according to claim 1, wherein said part of said user identification number assigned to said operator comprises at least three digits.

4. The method according to claim 1, wherein said telecommunication network is a PMR network.

5. The method according to claim 1, wherein said identification code stored in said identification code responds to syntax such as defined in one of the following standards:
   ITU-T E212;
   ITU-T E218; or
   IEEE.

6. A user terminal comprising an identification code configured by a method according to claim 1.

7. The method according to claim 1, wherein said specific identified sub number is assigned to a geographical sub area.

8. The method according to claim 1, wherein said specific identified sub number is assigned to a temporary mission.

* * * * *